United States Patent [19]
Boyce et al.

[11] Patent Number: 5,684,539
[45] Date of Patent: *Nov. 4, 1997

[54] METHOD AND APPARATUS FOR PROCESSING ENCODED VIDEO DATA TO REDUCE THE AMOUNT OF DATA USED TO REPRESENT A VIDEO IMAGE

[75] Inventors: Jill MacDonald Boyce, Manalapan; Frank Anton Lane, Medford Lakes, both of N.J.; Larry Pearlstein, Newton, Pa.

[73] Assignee: Hitachi America, Ltd., Tarrytown, N.Y.

[ * ] Notice: The term of this patent shall not extend beyod the expiration date of Pat. No. 5,592,299.

[21] Appl. No.: 694,904

[22] Filed: Aug. 9, 1996

Related U.S. Application Data

[63] Continuation of Ser. No. 311,811, Sep. 26, 1994, Pat. No. 5,592,299.

[51] Int. Cl.$^6$ ................................................ H04N 7/12
[52] U.S. Cl. .......................... 348/420; 348/421; 348/415
[58] Field of Search ................................. 348/420, 421, 348/415, 416, 446; 358/311; 360/10.1, 10.3

[56] References Cited

U.S. PATENT DOCUMENTS

| | | |
|---|---|---|
| 4,355,324 | 10/1982 | Reitmeier . |
| 4,558,376 | 12/1985 | Heitmann . |
| 4,807,053 | 2/1989 | Heijnemans . |
| 4,825,301 | 4/1989 | Pape et al. . |

(List continued on next page.)

FOREIGN PATENT DOCUMENTS

| | | |
|---|---|---|
| 0 367 264 A2 | 5/1990 | European Pat. Off. . |
| 0 469 842 A2 | 2/1992 | European Pat. Off. . |
| 0 505 985 A2 | 9/1992 | European Pat. Off. . |
| 0 505 985 A3 | 9/1992 | European Pat. Off. . |
| 0 509 594 A2 | 10/1992 | European Pat. Off. . |
| 622957 | 4/1993 | European Pat. Off. . |
| 0 562 845 A2 | 9/1993 | European Pat. Off. . |
| WO 91/02430 | 2/1991 | WIPO . |

OTHER PUBLICATIONS

Drafts of Recommendation H.262,ISO/IEC 13818-1 titled "Information Technology—Generic Coding of Moving Pictures and Associted Audio", Nov. 1993—ISO-MPEG Committee Draft.

Drafts of Recommendation H.262,ISO/IEC 1318-2 titled "Information Technology—Generic Coding of Moving Pictures and Associated Audio", Nov. 1993—ISO-MPEG Committee Draft.

Feng-Ming Wang and Dimitris Anastasiou, "High Quality Coding of the Even Fields Based on the ODD Field of the Interlaced Video Sequences", IEEE Transactions on Circuits and Systems, Jan. 1991.

*Primary Examiner*—Tommy P. Chin
*Assistant Examiner*—Luanne P. Din
*Attorney, Agent, or Firm*—Michaelson & Wallace; Michael P. Straub; Peter L. Michaelson

[57] ABSTRACT

Methods and apparatus for processing digital video data to reduce the amount of video data required to represent a video frame by representing a frame or pair of field pictures into a single field of a pair of field picture are described. To prevent the second field of the field picture from being displayed a DSM byte associated with the field picture is set so that only the field representing the video frame is displayed. A field, e.g., a transparent predictively coded field is used as the field picture which is not displayed. In this manner, very little data is required to represent the field picture that is not displayed. When the received frames are represented as pairs of field pictures a single field of the pair of field pictures is selected to represent the video frame with the other field picture being replaced with a field which requires very little data. When frame pictures are received one of a plurality of numerous described methods of mapping frame pictures into a single field of a pair of field pictures are used to convert the frame picture into a single field of a pair of field pictures. A plurality of methods for reducing the amount of data required to represent the single field of the pair of field pictures are also described.

23 Claims, 6 Drawing Sheets

U.S. PATENT DOCUMENTS

| | | |
|---|---|---|
| 4,887,169 | 12/1989 | Bannai et al. . |
| 4,910,605 | 3/1990 | Sasaki et al. . |
| 4,931,879 | 6/1990 | Koga et al. . |
| 5,023,710 | 6/1991 | Kondo et al. . |
| 5,065,259 | 11/1991 | Kubota et al. . |
| 5,119,208 | 6/1992 | Fujimoto . |
| 5,126,852 | 6/1992 | Nishino et al. . |
| 5,132,807 | 7/1992 | Takimoto et al. . |
| 5,134,464 | 7/1992 | Basile et al. . |
| 5,136,391 | 8/1992 | Minami . |
| 5,140,417 | 8/1992 | Tanaka et al. . |
| 5,140,437 | 8/1992 | Yonemitsu et al. . |
| 5,144,425 | 9/1992 | Joseph . |
| 5,148,272 | 9/1992 | Acampora et al. . |
| 5,212,549 | 5/1993 | Ng et al. . |
| 5,225,946 | 7/1993 | Uchiumi . |
| 5,262,854 | 11/1993 | Ng .................................. 348/416 |
| 5,282,049 | 1/1994 | Hatakenaka et al. . |
| 5,335,117 | 8/1994 | Park et al. . |
| 5,347,308 | 9/1994 | Wai .................................. 348/416 |
| 5,355,229 | 10/1994 | Arano et al. . |
| 5,377,051 | 12/1994 | Lane et al. . |
| 5,386,241 | 1/1995 | Park . |
| 5,390,052 | 2/1995 | Kato et al. . |
| 5,418,623 | 5/1995 | Park . |
| 5,424,779 | 6/1995 | Odaka et al. ................... 348/416 |
| 5,430,488 | 7/1995 | Hedley .......................... 348/446 |
| 5,477,397 | 12/1995 | Naimpally et al. . |
| 5,493,456 | 2/1996 | Augenbraun et al. . |

4:2:0 Macroblock structure

FIG. 1A PRIOR ART

4:2:2 Macroblock structure

FIG. 1B PRIOR ART

4:4:4 Macroblock structure

METHOD AND APPARATUS FOR PROCESSING ENCODED VIDEO DATA TO REDUCE THE AMOUNT OF DATA USED TO REPRESENT A VIDEO IMAGE

RELATED APPLICATIONS:

This application is a continuation of pending U.S. patent application Ser. No. 08/311,811 which was filed on Sep. 26, 1994 now U.S. Pat. No. 5,592,299.

FIELD OF THE INVENTION

The present invention is directed to the processing of digital video data to reduce the amount of video data required to represent a video frame, and more particularly to a method of representing video frames as field pictures in a manner that makes the field pictures particularly well suited for use during digital video tape recorder ("VTR") trick play operation.

BACKGROUND OF THE INVENTION

Generally, VTRs are designed to receive and store data signals representing video (and audio information) by recording the data on a magnetic tape in a series of tracks. In addition, most VTRs are designed to support both normal and trick playback operation, i.e., fast forward and reverse operation.

The use of digital video signals, e.g., digital high definition television ("HDTV") signals, which are normally transmitted in a compressed format, present problems with regard to the implementation of trick playback operation in VTRs.

Various systems have been proposed that would locate data selected to be used during trick play operation in specific locations within the tracks on a tape, referred to as trick play tape segments, so that at least a minimum amount of data required to produce recognizable images during trick playback operation can be read in a reliable manner from the tape. However, because of limitations on the amount of data that can be read back from the tape during trick play operation using such systems, video images used for trick play operation must usually be represented using considerably less data than is used to represent images, e.g., frames, that are displayed during VTR normal playback operation.

In order to maintain compatibility with a receiver, it is expected that reduced resolution video frames used for VTR trick play operation will have to conform to the same video data standard that is used to represent full resolution video frames during VTR normal play operation.

The International Standards Organization has set a standard for video data compression for generating a compressed digital data stream that is expected to be used for digital television. This standard is referred to as the ISO MPEG-2 (International Standards Organization Moving Picture Experts Group) ("MPEG-2") standard.

Because the MPEG-2 standard is likely to be used in a wide variety of digital video applications, it is highly desirable that a VTR be capable of generating video images, e.g., low resolution video frames, that are both MPEG-2 compliant and also suitable for use during trick play operation, e.g., because of the relatively small amount of data used to represent the video images.

For the purposes of this application, unless indicated otherwise, terms will be used in a manner that is consistent with the MPEG-2 standard that is described in the International Standards Organization—Moving Picture Experts Group, Drafts of Recommendation H.262, ISO/IEC 13818-1 and 13818-2 titled "Information Technology-Generic Coding Of Moving Pictures and Associated Audio" (hereinafter "the November 1993 ISO-MPEG Committee draft") hereby expressly incorporated by reference. Any references made in this patent application to MPEG-2 data streams is to be understood to refer to data streams that comply with MPEG-2 standards as defined in the November 1993 ISO-MPEG Committee draft.

MPEG-2 provides for video images to be encoded into a series of macroblocks with each macroblock corresponding to a different spatial portion of a video image. Each macroblock includes a plurality of luminance blocks, e.g., four luminance blocks and a plurality of chrominance blocks with each block being encoded using a discrete cosine transform ("DCT") coding operation.

Figure 1A:
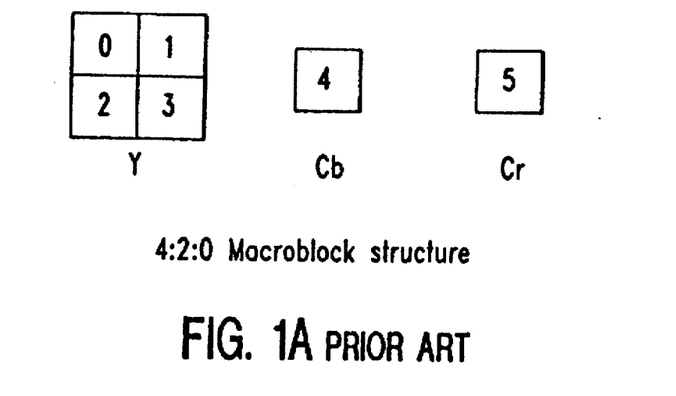
FIGS. 1A–1C illustrate various possible MPEG-2 compliant macroblock structures.
Figure 1B:
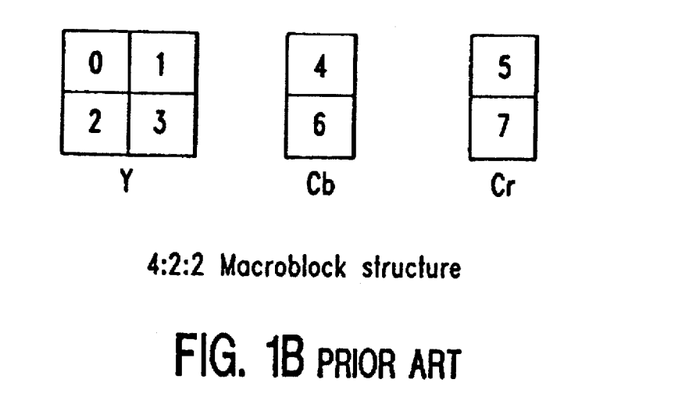
Figure 1C:
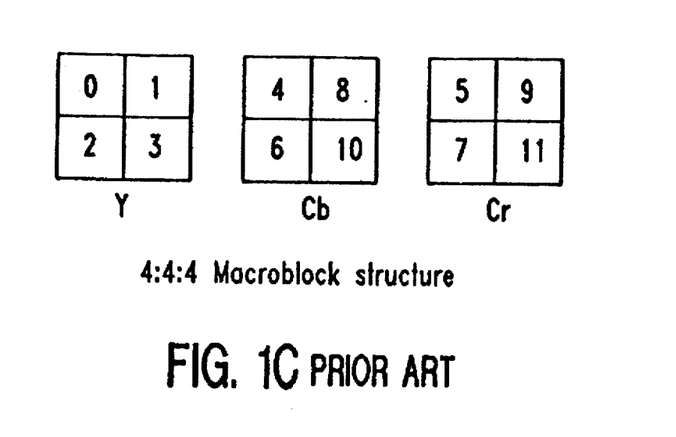

Referring now to the figures, FIG. 1A illustrates a 4:2:0 macroblock structure in which four luminance blocks and two chrominance blocks are used to represent the spatial area of a video image corresponding to the macroblock. FIG. 1B illustrates a 4:2:2 macroblock structure which uses four luminance blocks and 4 chrominance blocks while FIG. 1C illustrates a 4:4:4 macroblock structure where 4 luminance blocks and 8 chrominance blocks are used to represent the spatial area of a video image corresponding to the macroblock.

In accordance with MPEG-2, video images, e.g., HDTV frames, may be encoded into either a frame picture or a pair of field pictures. Each frame comprises one or more macroblocks. Macroblocks of a frame picture may be encoded using a frame DCT format or a field DCT format with the resulting macroblock being referred to as a frame macroblock or a field macroblock of a frame picture.

Figure 1D:
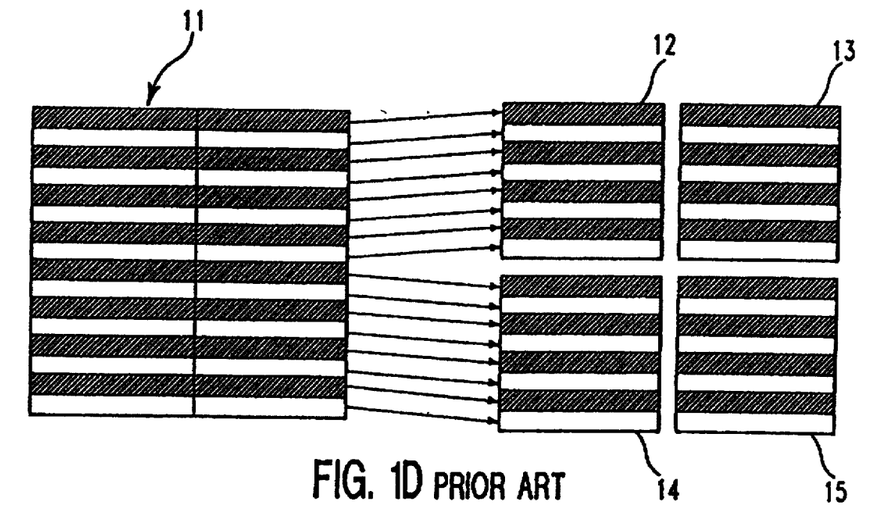
FIG. 1D illustrates the block structure of the luminance component of a frame DCT macroblock of a frame picture.

Referring now to FIG. 1D, on the left there is illustrated a section of a video image 11 corresponding to, e.g., a block of 16×16 pixels where each row, i.e., raster of pixels, corresponds to, e.g., 16 pixels. On the right, there is illustrated the luminance portion of a frame macroblock of a field picture corresponding to the video image 11 with the 4 blocks 12, 13, 14, 15, each corresponding to, e.g., an 8×8 block of pixels of the video image 11 as illustrated. It should be noted for the purpose of clarity, that in FIGS. 1D, 1E and 1F the white portion of the illustrated blocks correspond to one instance in time while the shaded portions correspond to another instance in time.

Figure 1E:
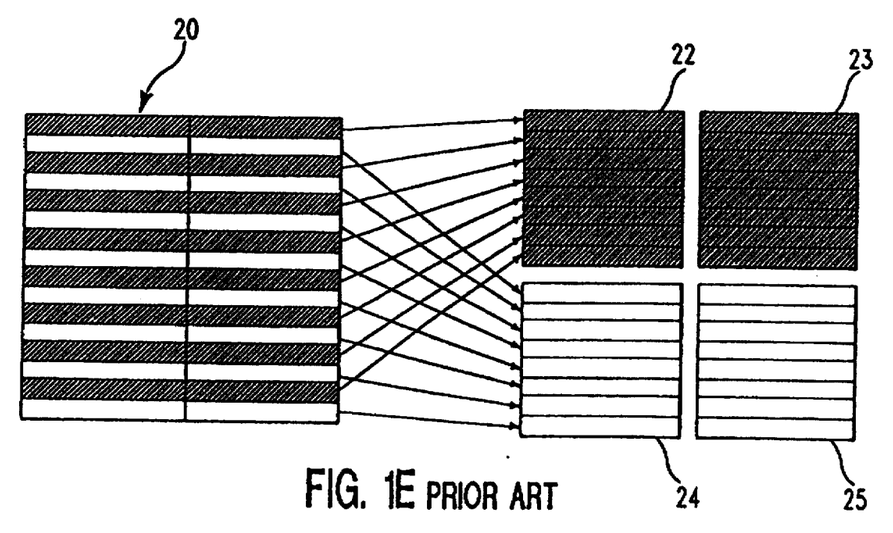
FIG. 1E illustrates the block structure of the luminance component of a field DCT macroblock of a frame picture.

Referring now to FIG. E, on the left there is illustrated a section of a video image 20, e.g., a 16×16 block of pixels. On the right there is illustrated the luminance portion of a field macroblock of a frame picture which comprises the four blocks 22, 23, 24, 25. As illustrated, the structure of a field macroblock of a frame picture is such that each block corresponds to only odd or even rows of pixels while the structure of a frame macroblock of a frame picture provides for each block to correspond to both odd and even rows of pixels.

Figure 1F:
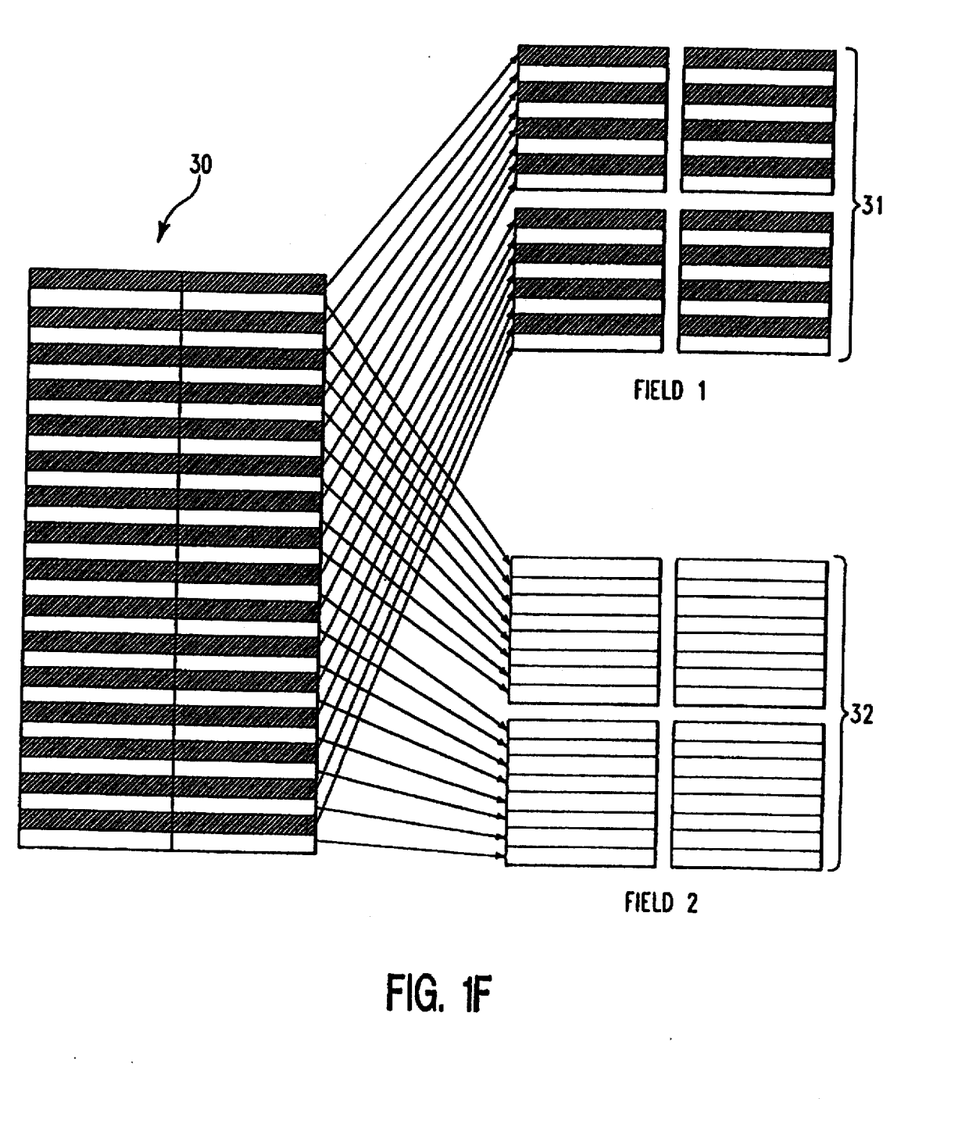
FIG. 1F illustrates the block structure of the luminance component of a macroblock corresponding to a first field picture and a macroblock corresponding to a second field picture of a pair of field pictures.

Referring now to FIG. 1F there is illustrated a portion of a video image 30, e.g., a block of 16×32 pixels. On the right, there is illustrated the structure for the luminance portion 31, 32 of a macroblock of a first field and a second field of a frame picture. Macroblocks of field pictures, unlike macroblocks of frame pictures, can be encoded using only a single format. As illustrated in FIG. 1F, a macroblock 31 of the first field of a field picture corresponds to the even rows of pixels of the video image 30, e.g., frame, while a macroblock of the second field of a field picture corresponds to the odd rows of pixels of the video image 30.

Accordingly, each macroblock of a field picture spans the same number of columns of pixels as a frame picture macroblock but twice as many rows with each macroblock of the first field containing data corresponding to the even rows and the macroblock of the second field containing data corresponding to the odd rows.

Thus, when represented as field pictures, each frame is represented as two separate fields which represent different instances in time. Accordingly, field pictures represent interlaced video images. MPEG-2 provides for an optional control digital storage media ("DSM") header control byte which includes a two bit field_id flag which is used to support freeze frame mode when using interlaced pictures. By setting the field_id flag of the DSM byte to a preselected value, a receiver can be made to display only either the first or second field of a field picture or both fields of a field picture.

In the case of trick play, where a frame may be repeated several times, the use of interlaced video may cause annoying flicker as the first and second fields of a video frame which includes motion, are repeated several times. For example, if during trick play, a frame represented as a field picture is repeated three times, the fields of the frame would be displayed in the following sequence field 1, field 2, field 1, field 2, field 1, field 2.

In order to support trick play operation in a digital VTR, e.g., a digital VTR that is designed to work with an MPEG-2 data stream, because of the limited space available on a tape for storing trick play data, it is desirable that a VTR be capable of generating low resolution or reduced resolution images from an MPEG-2 data stream representing, e.g., an HDTV signal, which can then be used to support trick play operation.

Accordingly, there is a need for a method and apparatus for generating video frames, e.g., low resolution video frames, using a small amount of data, that are suitable for recording in track play tape segments on a tape and for reading back from the tape during trick play operation.

Furthermore, it is highly desirable that the low resolution video frames be capable of being generated form the video data that represents the normal play video data which a VTR is expected to be received by a VTR so that the VTR need not be sent additional data, separate form the normal play video data, to support trick play operation.

In addition, it is desirable that the low resolution video frames used for trick play operation produce a minimal amount of flicker which can be annoying to a viewer.

SUMMARY OF THE PRESENT INVENTION

The present invention is directed to methods and apparatus for processing digital video data to reduce the amount of video data required to represent a video frame, and more particularly to a method of representing video frames as field pictures in a manner that makes the field pictures particularly well suited for use during video tape recorder ("VTR") trick play operation.

The data extraction method and apparatus of the present invention can be incorporated and/or combined with the numerous data extraction methods designed to support VTR trick play operation described in U.S. patent applications Ser. No. 08/298,015 titled "METHOD AND APPARATUS FOR THE SELECTION OF DATA FOR USE IN VTR TRICK PLAY OPERATION IN A SYSTEM USING PROGRESSIVE PICTURE REFRESH"; and U.S. patent application Ser. No. 08/228,949 titled "METHOD AND APPARATUS FOR THE SELECTION OF DATA FOR USE IN VTR TRICK PLAY OPERATION IN A SYSTEM USING PROGRESSIVE PICTURE REFRESH" and U.S. patent application Ser. No. 08/003,930 titled "DIGITAL VIDEO RECORDING DEVICE WITH TRICK PLAY CAPABILITY" each of which is hereby expressly incorporated by reference.

In a first embodiment, of the present invention, one field of a pair of field pictures representing a video frame is replaced with a field picture that is MPEG compliant but requires less data than was required to represent the field picture which it replaces. The value of a DSM byte, e.g., the field_id flag of the DSM byte, is then set so that only the field of the pair of field pictures that was originally received, and optionally processed to reduce the amount of data required to represent the field, is displayed. In addition, the mode bits of the DSM byte are set to indicate one of the following three possible modes of VTR operation, i.e., fast forward, fast reverse or still VTR operation. In this manner, it is possible to represent video frames as a single field picture which can be processed to decrease the amount of data required to represent the single field picture. Representing video frames in such a manner provides a convenient way of representing video frames using only a small amount of data. Accordingly using a single field picture of a pair of field pictures to represent a video frame is particularly well suited for supporting trick play operation in digital VTR where the amount of data used to represent video frames is important.

In a second embodiment, frame pictures are converted into a signal field picture, e.g., a low resolution field picture, and then a second field is added to form a pair of field pictures. As with the first embodiment discussed above, the DSM byte is set to prevent the second field picture of the pair of field pictures from being displayed during playback. Because the second field is not displayed during playback, it may be e.g., a transparent P- field which requires very little data to represent the field. A plurality of methods for converting frame pictures into a single field picture of a pair of field pictures are described.

Low resolution pairs of field pictures generated in accordance with the present invention may be recorded, e.g., in trick play tape segments on a tape, to support VTR trick playback operation.

Because the field picture not used to represent the video frame, e.g., the second field, of a pair of field pictures generated in accordance with the present invention will not be displayed during trick playback operation as a result of the setting of the DSM byte, flicker is reduced since a single field will be repeated for the entire hold time associated with the field picture being displayed during VTR trick playback operation. In this context the hold time represents the number of frame times the field is repeated where a frame time is the time required to display a normal full resolution video frame.

In addition, because the method of the present invention provides for representing video frames using a relatively small amount of data as compared with some other techniques, it is possible to record more video frames in the limited trick play space available on a tape to support trick playback operation. This permits the hold times associated with each video frame displayed during trick play operation to be reduced as compared to the hold times required when more data is used to represent frames used for trick play operation. By decreasing frame hold times in trick play, performance will generally be improved because more frames will be displayed during a given period of time.

Thus, the present invention provides a method of representing video frames in a low resolution format that is particularly well suited for VTR trick play operation.

Various other features, embodiments and advantages of the method and apparatus of the present invention are discussed below.

DETAILED DESCRIPTION

The present invention is directed to the processing of digital video data to reduce the amount of video data required to represent a video frame, and more particularly to a method of representing video frames as a single field picture of a pair of field pictures in a manner that makes the field pictures particularly well suited for use during video tape recorder ("VTR") trick play operation.

Figure 2:
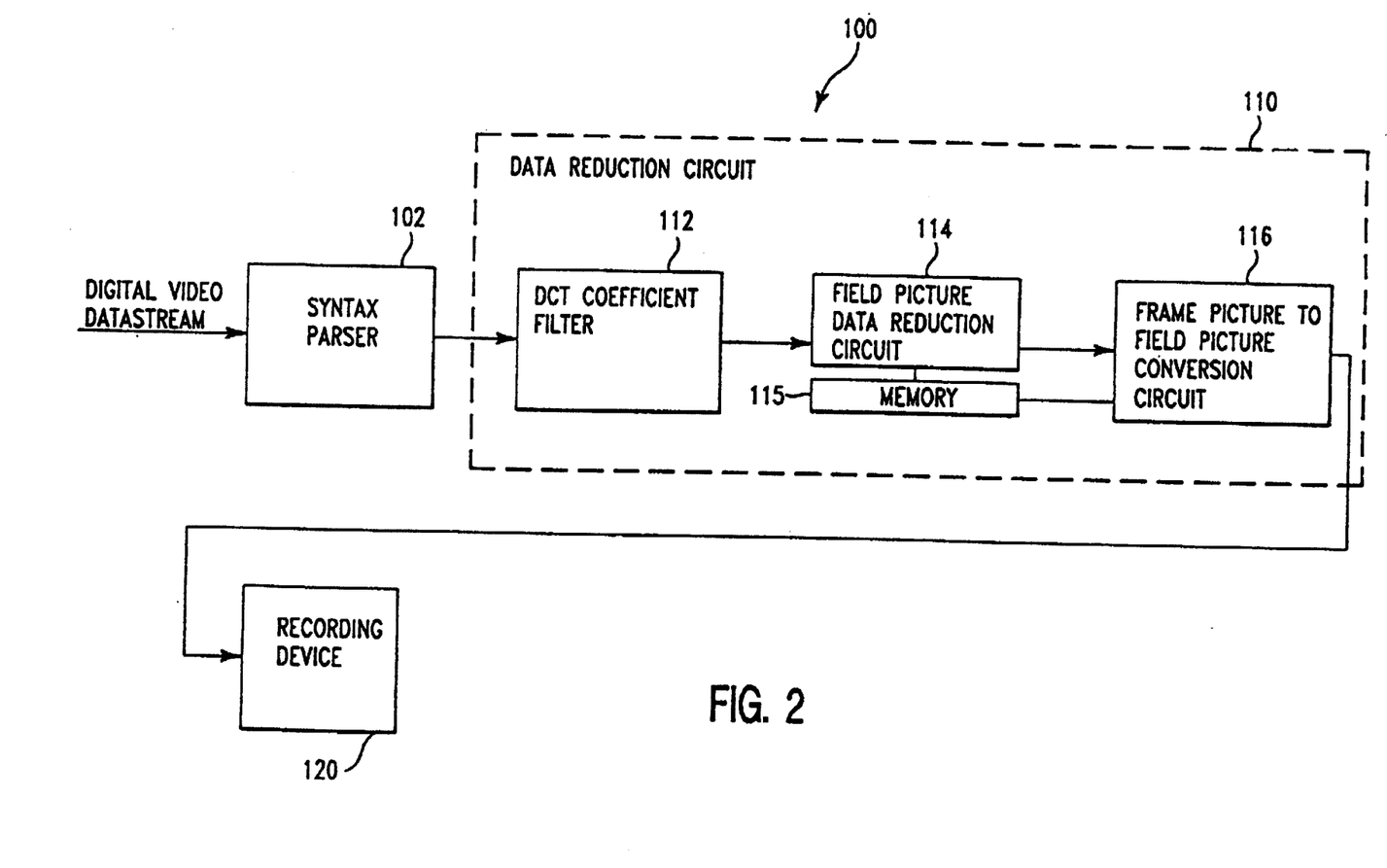
FIG. 2 illustrates a video data according circuit in accordance, with the present invention.

Referring now to FIG. 2, there is illustrated a video data processing circuit 200 implemented in accordance with one embodiment of the present invention.

As illustrated, the video data processing circuit 200 comprises a syntax parser 102 which is coupled to a data reduction circuit 100. The data reduction circuit 100 is, in turn, coupled to an input of a recording device 120, e.g., a recording circuit of a digital VTR.

The syntax parser receives a digital video data stream, e.g., an MPEG-2 data stream, as an input signal. The syntax parser 102 receives the video data stream which includes data representing, e.g., field pictures and/or frame pictures. The syntax parser 102 parses the received data stream to identify data representing different video frames and to generate as its output MPEG coding elements, e.g., macroblocks including DC and AC DCT coefficients. The syntax parser 12 may be thought of as performing a partial variable length decode operation in that individual MPEG coding elements are identified in the variable length encoded data stream along with the video frame to which they correspond.

The data reduction circuit 110 receives the video data representing received video frames from the output of the syntax parser 102 and processes the video frame data to reduce the amount of data to produce a low resolution video frame which uses less data than the corresponding received video frame. The low resolution video frames generated by the data reduction circuit 110 are supplied to the recording device 120 which records the low resolution video frames in trick play tape segments on a tape, i.e., tape segments from which data will be read during VTR trick playback operation, e.g., fast forward operation.

In accordance with the present invention, the data reduction circuit 110 includes an optional DCT coefficient filter 112 for removing preselected DCT coefficients from the video data representing the macroblocks of a video frame to thereby reduce the amount of data required to represent the video frame whether the frame is represented as a frame picture or a pair of field pictures.

In one embodiment, the DCT coefficient filter 112 removes all the AC DCT coefficients from each macroblock that is processed by the DCT coefficient filter. In such a case, the macroblocks of each frame or field processed by the DCT coefficient filter 112 are represented by the DC DCT coefficients which are left after the filtering process is performed.

In addition to the DCT coefficient filter 112, the data reduction circuit includes a field picture data reduction circuit 114, a frame picture to field picture conversion circuit 116, and a memory device 115 for storing data corresponding to a row of macroblocks.

As an alternative to the use of the DCT coefficient filter 112, when field pictures are being processed, other alternative data reduction devices such as a trick play data prioritization and selection circuit may be used to reduce the amount of data required to represent one or both fields of a field picture. A trick play data prioritization and selection circuit accomplishes data reduction by prioritizing the data representing a field picture and then selecting a subset of that data which is then output as the reduced data version of the processed field.

The field picture data reduction circuit 114 is responsible for identifying and processing field pictures in accordance with the present invention to reduce the amount of data required to represent the identified field pictures.

In accordance with the present invention, one field of a pair of field pictures is retained while the other field is replaced with a field that is represented by less data than the field which it is replacing. In order to insure MPEG compliance, the first field of the pair of field pictures is made, or selected to be, an intracoded ("I-") field picture.

For example, in one embodiment, if a first field, i.e., an I-field and a second field, which could be either an I- field or a predictively coded ("P-") field of a field picture pair are received, the second field picture is replaced with a field picture, e.g., a P-field which requires very little data.

In one embodiment, the second field is made to be a P-field which is represented by very few bits by setting all difference data and motion vectors to 0, so that most of the macroblocks would be skipped resulting in a transparent field.

In accordance with the present invention, to insure that the field picture which is replaced is not displayed, the field_id flag bits of a DSM byte associated with the field picture being processed is set so that the field that has been replaced is not displayed. In addition the mode bits of the DSM byte are set to indicate one of the following three modes of VTR operation, i.e., fast forward, fast reverse or still operation. If a DSM byte associated with the pair of field pictures being processed does not already exist, e.g., as part of a header, a DSM byte with the field_id flag bits and mode bits set to prevent the replaced field from being displayed is added to the pair of field pictures.

In this manner, by processing the field that will be displayed, either by using a DCT coefficient filter or a data prioritization and selection circuit, to reduce the amount of data required to represent that field picture and by then replacing the remaining field picture of the pair of field pictures with a low data field, MPEG compliant video frames in the form of pairs of field pictures can be generated using relatively small amounts of data. Because of the small amount of data required to represent video frames as such field pictures, they are particularly well suited for use during trick play operation. Furthermore, because the DSM byte is used to cause only one field of the pair of field pictures to be displayed, flicker is reduced as compared to when both fields of a field picture pair, including motion, are displayed.

The field picture data reduction circuit 114 outputs the reduced data field pictures generated by the circuit 114 and also outputs frame pictures received at its input.

The frame picture to field picture ("FP-FP") conversion circuit 116, receives the data output by the field picture data reduction circuit 114 and process received frame pictures to convert them into pairs of field pictures where only one field, e.g., the first field, of each pair of field pictures is used to represent the data from a corresponding frame picture. This is achieved by using a DSM byte associated with each pair of field pictures in the manner described above.

The FP-FP conversion circuit 116 operates to convert each frame picture to a field picture on an individual basis.

Pairs of macroblocks of a frame picture which correspond to vertically adjacent spatial positions within the video frame are processed to convert each pair of vertically adjacent macroblocks of the frame picture to a macroblock of one field of a pair of field pictures.

Because the luminance components of a macroblock comprise a major portion of each macroblock and are represented using four blocks, as illustrated in FIGS. 1A, 1B, and 1C regardless of the particular macroblock structure, the process of converting the luminance components of pairs of macroblocks from a frame picture to a macroblock of a field picture will be described in detail. It will be apparent to one of ordinary skill in the art, in view of the present disclosure, that the chrominance components of a pair of macroblocks being processed can be converted using a process similar to or the same as the method used to convert the luminance components of a frame picture macroblock to a field picture macroblock format.

It should be noted that the number of macroblocks per video frame is a function of the size of the video frame. Accordingly, some video frames represented as frame pictures may include multiple rows and columns of vertically adjacent pairs of macroblocks. The memory device 115 is selected to be large enough to store the data corresponding to at least one full row of macroblocks, or the amount of data corresponding to a row of macroblocks after filtering by the DCT coefficient filter where such a filter is used. This insures that the FP-FP conversion circuit 116 will be able to combine vertically adjacent pairs of macroblocks which represent vertically adjacent rows, by combining the macroblocks of a first row, which was received and stored, with the macroblocks of a second, e.g., subsequently received row as the macroblocks of the second row are received. In such an embodiment only every other row of macroblocks of a video frame need be stored.

Figure 3A:
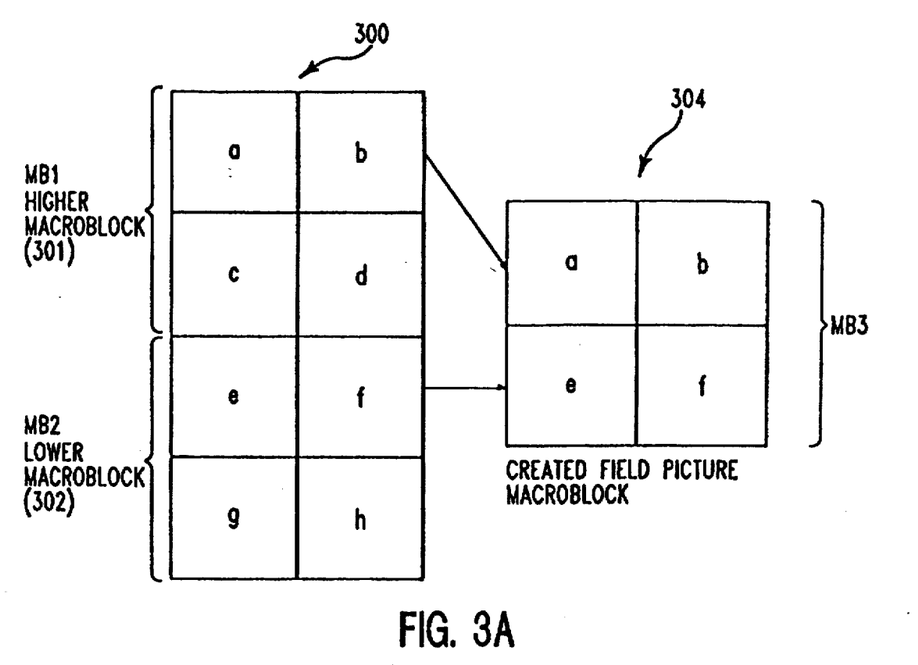
FIGS. 3A–3C illustrate the block structure of the luminance component of a macroblock of a field picture created in accordance with the present invention from a pair of vertically adjacent macroblocks of a frame picture.
Figure 3B:
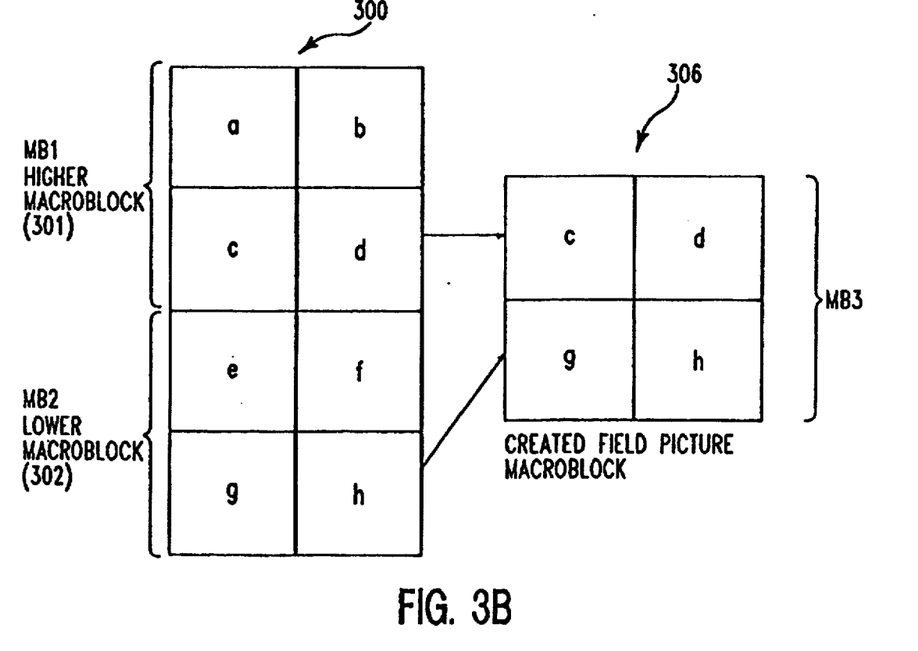
Figure 3C:
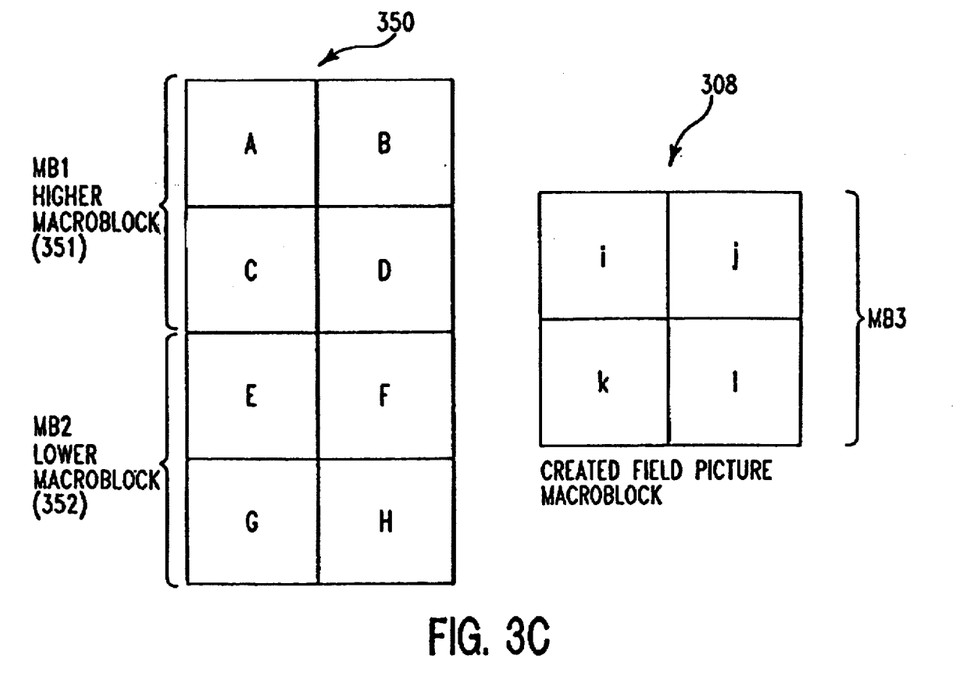

In discussing the process of converting macroblocks of frame pictures to macroblocks of one field of a pair of field pictures, in accordance with the present invention, references to the macroblocks or macroblock pairs illustrated in FIG. 3A–3C are to be understood to refer to the luminance components of the macroblocks being converted.

The conversion process implemented by the FP—FP conversion circuit 116 for converting a pair of vertically adjacent macroblocks of a frame picture into a single macroblock of a field picture, when all the AC DCT coefficients have been previously removed from the macroblocks being processed by, e.g., the DCT coefficient filter, will now be described with reference to FIGS. 3A and 3B. The described conversion method can be used to convert either field or frame DCT coded macroblocks of a frame picture into a field picture macroblock.

On the left side of FIGS. 3A and 3B there is illustrated a vertically adjacent pair of macroblocks 300 of a frame picture. The pair of macroblocks 300 comprises a higher macroblock MB1 301 and a lower macroblock MB2 302. The letters a, b, c, and d are used to represent the DC DCT coefficients of the four luminance blocks that comprise the higher macroblock MB1 300. Similarly, the letters e, f, g and h are used to represent the DC DCT coefficients of the four luminance blocks that comprise the lower macroblock MB2 302. Each DC DCT coefficient a, b, c, d, e, f, g, h represents the average luminance of all 8×8 pixels of the video frame corresponding to the particular block.

Referring now to FIG. 3A, in accordance with one embodiment of the present invention, a macroblock 304, corresponding to one field of a field picture, is generated by using the DC DCT coefficients (a, b) of the upper two blocks of the higher macroblock 301 as the DC DCT coefficients of the two upper blocks of the macroblock 304 being created and by using the DC DCT coefficients (e, f) of the lower macroblock (302) as the DC DCT coefficients of the two lower blocks of the field picture macroblock 304.

In an alternative embodiment illustrated in FIG. 3B, a macroblock 306 of a field picture is generated by using the coefficients (c, d) of the lower two blocks of the higher macroblock 301 as the DC DCT coefficients of the two upper blocks of the field DCT macroblock and by using the DC DCT coefficients (g, h) of the lower macroblock (302) as the DC DCT coefficients of the two lower blocks of the field picture macroblock 304.

It should be noted that direct mapping of DCT coefficients from a pair of field DCT macroblocks of a frame picture 300 to a macroblock 304 of a field picture, can be performed without removing the AC DCT coefficients where the additional data reduction achieved by the omission of the AC DCT coefficients is not required.

However, when mapping frame DCT macroblocks of a frame picture to a macroblock of a field picture using the above described method, the AC DCT coefficients should be removed from the frame DCT macroblocks prior to performing the conversion process to achieve satisfactory results.

Another embodiment of the present invention which uses DC DCT coefficient averaging to map either field or frame DCT macroblocks of a frame picture into a field picture macroblock will now be described. The mapping of a vertically adjacent pair of macroblocks of a frame picture into a macroblock of a field picture will now be described with reference to FIG. 3C. On the left of FIG. 3C there is illustrated a pair of vertically adjacent macroblocks 351, 352 of a frame picture.

In accordance with one embodiment of the FP—FP conversion circuit 116, the FP—FP circuit 116 first groups the DC DCT coefficients of the blocks of the pair of frame picture macroblocks together as DC DCT coefficient pairs in accordance with a preselected arrangement and then the DC DCT coefficient values of each DC DCT coefficient pair are averaged to generate a new set of values used for DC DCT coefficients of the macroblock of the field picture being generated.

For example, the DC DCT coefficients values of each coefficient pair (A, C) (B, D) (E, G) (F, H) could be averaged together to form a new set of coefficient values i, j, k, l, respectively, which could be used as the coefficient values of the blocks which comprise the macroblock 308 of a field picture illustrated in FIG. 3C. In such a case, the value of i=A+C/2; j=B+D/2; K=E+G/2; and l=F+H/2. It should be noted that this grouping of DC DCT coefficient values is just one exemplary mapping and that other mapping arrangements are possible.

Either the direct mapping method or the DC DCT coefficient averaging method of converting a vertically adjacent pair of macroblocks to a field picture macroblock may be used on either frame DCT or field DCT macroblocks of a frame picture. However, the direct mapping approach gives superior results when mapping field DCT macroblocks into a field picture macroblock, while the averaging approach givers superior results when converting frame DCT macroblocks to a field picture macroblock.

By mapping two macroblocks of a frame picture into a single macroblock 308 of a field picture, the amount of data required to represent the video image corresponding to the frame picture, is significantly reduced. However, there will also be a corresponding reduction in spatial resolution, i.e., the resulting macroblocks will have a height corresponding to 16 rows of pixels, i.e., the height of the pair of frame macroblocks from which the field macroblock was generated, but will comprise only 8 rows of pixels. The width, in terms of pixels of the generated macroblock, will be the same as the original frame macroblocks, e.g., 8 rows of pixels. Thus, while the generated macroblock of the field picture will correspond to the same number of pixels as the macroblocks of the frame picture, it corresponds to an area twice the height of the area to which each macroblock of the frame picture corresponds.

Because in accordance with the present invention, the second field of a pair of field pictures is added only to maintain MPEG compliance and is not displayed because of the setting of the DSM byte, spatial resolution is effectively halved by mapping two macroblocks of a frame picture into a macroblock of a field picture in the manner described above as compared to the frame picture representation.

In one embodiment of the present invention, when converting a pair of vertically adjacent field DCT macroblocks of a frame picture into a field picture macroblock, to reduce the loss of spatial resolution resulting from using a single field of a pair of field pictures to represent a frame picture, an AC DCT coefficient, in addition to a DC DCT coefficient is used for each block of a macroblock. In accordance with such an embodiment, the FP-FP conversion circuit 116 calculates an AC DCT value, e.g., the [1][0] DCT coefficient corresponding to the first vertical component of the DCT, for each DC DCT coefficient generated by averaging a pair of DC DCT coefficients to combine the blocks corresponding to the coefficients.

While the DC DCT coefficient is generated by merely averaging the two DC DCT coefficient values of two different blocks, e.g., (X+Y)/2, where X and Y are the DC DCT coefficient values, the AC DCT coefficient values are generated by multiplying a preselected constant K time the difference in coefficient values, e.g., (K*(X−Y) ). K is a predetermined value based on the DCT formula and scaling constants. For satisfactory results when operating with an MPEG-2 compliant data stream, K should be somewhere in the range between 0 and 3, with a value of K=2 having shown satisfactory results in a simulation.

As an example of the above described embodiment, reference will again be made to FIG. 3A. In a previously described example the averaging of the DC DCT coefficient values of each coefficient pair (A, C) (B, D) (E, G) (F, H) and the formation of a new set of coefficient values, i.e., DC DCT coefficient values, i, j, k, l was described.

In accordance with the embodiment of the present invention which also generates one AC DCT coefficient for each block of a macroblock, AC DCT values are generated and used with the DC DCT values to represent each block of the field picture being generated.

In such a case the DCT coefficients for the block corresponding to the letter i would be as follows: (A+C)/2 for the DC DCT coefficient and K*(A−C) for the AC DCT coefficient. The DCT coefficients for the block corresponding to the letter j would be (B+D)/2 for the DC DCT coefficient, and K*(B−D) for the AC DCT coefficient. The DCT coefficients for the block corresponding to the letter k would be (E+G)/2 for the DC DCT coefficient, and K*(E−G) for the AC DCT coefficient. The DCT coefficients for the block corresponding to the letter l would be (E+G)/2 for the DC DCT coefficient, and K*(E−G) for the AC DCT coefficient. As discussed above other mapping arrangements are also possible.

While the generation of the DC and one AC DCT coefficient for each block of a macroblock will require slightly more hardware than the generation of one DC DCT coefficient value alone for each block, the actual difference in hardware costs between the two embodiments is expected to be relatively low. For example, one additional row, i.e., stripes worth, of DC DCT coefficients may have to be stored. In the case of HDTV with 1920 pixels per line, this would require approximately (1920/16)*8 bits=960 bits of additional storage. In addition, additional circuitry to perform one subtraction and multiplication per block, not performed when only DC DCT coefficients are used to represent the generated blocks, may have to be provided.

Calculating single AC coefficients in the above described manner is particularly useful when converting frame DCT macroblocks of a frame picture into a field picture macroblock.

It should be noted that a DC and a single AC DCT coefficient may also be used to represent each created block of a field picture macroblock 304, 306 when field DCT macroblocks of a frame picture are directly mapped into a field picture macroblock. In such a case, both the DC and the [1][0]th DCT coefficients of the blocks which are incorporated into the field picture macroblock are retained. For example, if the field DCT macroblocks 301, 302 of the frame picture where mapped into a field picture macroblock as illustrated in FIG. 3A, the DC DCT coefficient and a single AC DCT coefficient corresponding to the blocks represented by the coefficients a, b, e, f, would be retained and used as the DCT coefficients of created field picture macroblock 304.

It should also be noted that it is possible to combine two vertically adjacent macroblocks using the methods described above even if one of the pair of vertically adjacent macroblocks is a frame DCT macroblock and the other a field DCT macroblock. However, in such a case, the resulting field picture macroblock may be of slightly lower quality than would be achieved if two frame picture macroblocks of the same were being converted into a field picture macroblock.

By using a single AC DCT coefficient, in addition to the DC DCT coefficient, to represent each block of a field picture macroblock in the above described manner, the resulting image quality will still have blocks that correspond to a 16×8 pixel area of the original image or frame, but the blocks will have a vertical variation so the effect is similar to the effect by using the DC DCT coefficients of 8×8 blocks, e.g., the original blocks of the frame picture, to represent the reduced resolution video frame. However, data rate savings are achieved by using the single field of a frame picture with DC and one AC DCT coefficient to represent each block, as compared to using only DC DCT coefficients of a frame picture to represent a video frame. Data rate savings are achieved by using a single field of a frame picture to represent a video frame since there are approximately half as many macroblocks to send. While each block of the macroblocks being sent will include both a DC DCT coefficient and an AC DCT coefficient and an End-Of-Block code, because more data is required to transmit the DC DCT coefficients and End-Of-Block codes than is required to send a single AC DCT coefficient for the same number of blocks, data rate savings of approximately 30% should be possible even when a DC and single AC DCT coefficient is used for each block, as compared to when only DC DCT coefficients are used to represent all the blocks of a frame picture.

Generally, the above discussion of how the FP—FP conversion circuit 116 operates has been largely limited to a discussion of mapping the luminance components of two vertically adjacent macroblocks of a frame picture into a format that corresponds to the macroblock structure of a field picture macroblock as illustrated in FIGS. 3A–3C.

As discussed above, in order to be MPEG-2 compliant each macroblock must contain a number of chrominance blocks.

Accordingly, in order to maintain MPEG-2 compliance, the chrominance components of the vertically adjacent macroblocks of a frame picture that are processed by the FP-FP conversion circuit 116 should also be mapped into a format that corresponds to the macroblock structure of a field picture macroblock.

In one embodiment, the chrominance information from one of the macroblocks in a pair of vertically adjacent macroblocks that is being converted into a field picture macroblock is simply selected by the FP—FP conversion circuit 116 to be used as the chrominance blocks of the field picture macroblock being generated.

In another embodiment, when the pair of vertically adjacent frame picture macroblocks being converted have a 4:4:4 macroblock structure as illustrated in FIG. 1C the 4×4 Cb and Cr chrominance blocks of the higher and lower macroblocks 301, 302 being converted are mapped into a field picture macroblock format in the same manner as described above with regard to FIGS. 3A–3C and the processing of the 4×4 luminance blocks which comprise the luminance component of each macroblock.

While the conversion of macroblocks from a frame picture format to a field picture format has been described above in great detail, it should be noted that field pictures include headers, e.g., picture headers and slice headers, which relate to the size of a picture and the arrangement of macroblocks within a picture. In particular, MPEG-2 requires that each row, i.e., stripe, of macroblocks be arranged into at least one slice with a slice header being used to identify the row of the picture to which the macroblocks of the slice correspond. This information is reflected in the slice header as a slice_vertical_position value.

As a result of the conversion of frame macroblocks to field macroblocks, the macroblocks that are generated may not be located in the same number row from which the source or source macroblocks came. Accordingly, in order to produce a field picture that is MPEG-2 compliant, the FP—FP conversion circuit 116 generates new slice headers which are associated with the field picture macroblocks of the field produced as a result of the conversion, e.g., mapping, operation. The new slice headers include the correct slice_vertical_position values for the generated macroblocks.

New picture headers are also generated to reflect the smaller picture dimensions and field structure of the field generated in accordance with the present invention.

In this manner, MPEG-2 compliance is maintained while video frames are effectively represented as a single field of a pair of field pictures.

Because of the relatively small amount of data required to represent a video frame using a single field of a pair of field pictures in accordance with the present invention, and the lack of annoying flicker, the field pictures generated by the data reduction circuit 110 are particularly well suited for use as trick play video frames.

Because of the numerous advantages of the data reduction circuit 110 of the present invention, it is expected that the data reduction circuit 110 will be useful as part of digital recording devices, designed to record digital HDTV or compressed NTSC signals, or any digital compressed interlaced video that supports field and/or frame pictures, on a tape in such a manner that the recorded data is intended to support video trick playback operation.

In addition to being implemented as a data reduction circuit 110, the present invention is also directed to a method of encoding video data for VTR trick play use. In accordance with the present invention, video data is encoded into a first set of video data, e.g., a series of MPEG-2 compliant video frames which form an MPEG-2 data stream. A subset of the video data encoded into the normal play video data stream is also encoded into a series of field pictures where only one field of each field picture is used to represent the video data that is being encoded. Such field pictures represent trick play video data. The field of each field picture, e.g., the second field, is made to be a field which requires very little data to represent the field, e.g., a transparent P- field. As part of the encoding process a DSM byte with the field_id flag set so that the second field of the field picture is not displayed is generated and the mode bits of the DSM byte are set to indicate one of a fast forward, fast reverse, or still mode.

The normal play video data generated by the encoding process of the present invention is recorded by a digital VTR on normal play tape segments of a tape while the trick play video data, i.e., pairs of field pictures, which use a single field to represent the encoded video data, are recorded in trick play tape segments of a tape. In this manner, the field pictures generated by the encoding process of the present invention will be displayed during VTR trick play playback operation. Thus, the field pictures generated in accordance with the present invention may be used as trick play video frames.

Trick play data created in accordance with the present invention, e.g., low resolution pairs of field pictures where only one field picture of the pair is used to represent actual video data, can be recorded in trick play data segments of a tape that are dedicated to fast forward or fast reverse, or to trick play data segments that are dual-purpose for both fast forward and fast reverse. When trick play data created using the above described methods is used in dual purpose trick play tape segments,during reverse playback operation, the VTR playback circuit should buffer up and reverse both fields of the pair of field pictures together as a unit.

What is claimed is:

1. A method of reducing the amount of data required to represent a video image, comprising the steps of:

receiving digital video data including a pair of field pictures, the pair of field pictures including a first field picture and a second field picture represented by digital data including encoded macroblocks;

replacing one of the field pictures, in the pair of field pictures, with a third field picture represented by less digital data then the field picture being replaced; and generating header information associated with the pair of field pictures, the header information including a control bit set to prevent a receiver from displaying the third field picture.

2. The method of claim 1, further comprising the step of recording the header information including the control bit and the pair of field pictures on a digital storage medium, the recorded pair of field pictures including the received encoded macroblocks representing the first field picture.

3. The method of claim 2, wherein the header information is a digital storage media control byte;

wherein the third field picture is a predictively coded field.

4. The method of claim 1, further comprising the step of storing the header information including the control bit and the pair of field pictures in a digital storage device, the recorded pair of field pictures including the received encoded macroblocks representing the first field picture.

5. The method of claim 2, wherein the first field picture is represented by a plurality of encoded macroblocks, each encoded macroblock including a plurality of blocks represented by a DC DCT coefficient and a plurality of AC DCT coefficients, and wherein the method further comprises the step of filtering each block to remove at least one of the AC DCT coefficients therefrom.

6. The method of claim 3, wherein the second field picture is the one of the field pictures replaced with the third field picture and wherein the data representing the first field picture includes a plurality of macroblocks, each macroblock including a plurality of DC and AC coefficients, and wherein the method further comprises the step of filtering the macroblocks of the first field picture to remove all the AC coefficients therefrom.

7. A method of reducing the amount of data required to represent a video image, comprising the steps of:

receiving a frame picture including encoded macroblocks representing the video image;

converting the frame picture into a first field picture including digital video data;

generating a second field picture, the second field picture including less digital video data than the first field picture, the first and second field pictures constituting a pair of field pictures;

generating header information associated with the pair of field pictures, the header information including a control bit set to prevent a receiver from displaying the second field of the field picture.

8. The method of claim 7, further comprising the step of recording the header information including the control bit and the pair of field pictures on a digital storage media.

9. The method of claim 7, wherein the frame picture includes a pair of vertically adjacent macroblocks, the pair of vertically adjacent macroblocks including an upper macroblock and a lower macroblock, the upper macroblock including a first and second upper luminance block and a first and second lower luminance block, the lower marcoblock including a first and second upper luminance block and a first and second lower luminance block, each of the luminance blocks including a DC DCT coefficient; and wherein the step of converting the frame picture into a first field picture includes the steps of:

grouping the DC DCT coefficients of the luminance blocks into four pairs in accordance with a preselected arrangement; and averaging the DC DCT coefficients of each pair to generate four DC DCT coefficients;

using the four generated DC DCT coefficients as the DC DCT coefficients of four luminance blocks of the first field picture.

10. The method of claim 7, wherein the step of converting the frame picture into a first field picture includes the additional steps of:

subtracting the second DC DCT coefficient of each pair of DCT coefficients from the first DC DCT coefficient of each pair of DC DCT coefficients and multiplying the result by a constant to generate four AC DCT coefficients, the constant being a positive number;

using the four generated AC DCT coefficients as the AC DCT coefficients of four luminance blocks of the first field picture, each luminance block of the first field picture including a DC DCT coefficient and one AC DCT coefficient.

11. The method of claim 7, wherein the frame picture includes a pair of vertically adjacent macroblocks, the pair of vertically adjacent macroblocks including an upper macroblock and a lower macroblock, the upper macroblock including a first and second upper luminance block and a first and second lower luminance block, the lower macroblock including a first and second upper luminance block and a first and second lower luminance block, each of the luminance blocks including a DC DCT coefficient; and wherein the step of converting the frame picture into a first field picture includes the steps of:

grouping the DC DCT coefficients of the luminance blocks into four pairs in accordance with a preselected arrangement;

subtracting the second DC DCT coefficient of each pair from the first DC DCT coefficient of each pair and multiplying the result by a constant to generate four AC DCT coefficients, the constant being a positive number; and using the four generated AC DCT coefficients as the AC DCT coefficients of four luminance blocks of the first field picture, each luminance block of the first field picture including one AC DCT coefficient.

12. The method of claim 7, wherein the frame picture includes a pair of vertically adjacent macroblocks, the pair of vertically adjacent macroblocks including an upper macroblock and a lower macroblock, the upper macroblock including a first and second upper luminance block and a first and second lower luminance block, the lower macroblock including a first and second upper luminance block and a first and second lower luminance block, each of the luminance blocks including a DC DCT coefficient having a DCT coefficient value, the DC DCT coefficient value of the first and second upper luminance blocks and the first and second lower luminance blocks of the upper macroblock being A, B, C, D respectively; the DC DCT coefficient value of the first and second upper luminance blocks and the blocks of the second lower luminance blocks of the lower macroblock being E, F, G, H respectively, wherein the first field picture includes a field picture macroblock, the field picture macroblock comprising first and second upper luminance blocks and first and second lower luminance blocks, each luminance block including a DC DCT coefficient, the DC DCT coefficient of the first and second upper luminance blocks of the field picture macroblock being I and J, respectively and the DC DCT coefficients of the first and second lower luminance blocks of the field picture macroblock being K and L, respectively; and wherein the step of converting the frame picture into a first field picture includes the steps of:
averaging the values A and C to generate the value I;
averaging the values B and D to generate the value J;
averaging the values E and G to generate the value K; and
averaging the values F and H to generate the value L.

13. The method of claim 7,
wherein the frame picture includes a pair of vertically adjacent macroblocks, the pair of vertically adjacent macroblocks including an upper macroblock and a lower macroblock, the upper macroblock including a first and second upper luminance block and a first and second lower luminance block, the lower macroblock including a first and second upper luminance block and a first and second lower luminance block, each of the luminance blocks including a DC DCT coefficient having a DCT coefficient value, the DC DCT coefficient value of the first and second upper luminance blocks and the first and second lower luminance blocks of the upper macroblock being A, B, C, D respectively; the DC DCT coefficient value of the first and second upper luminance blocks and the first and second lower luminance blocks of the lower macroblock being E, F, G, H respectively, wherein the first field picture includes a field picture macroblock, the field picture macroblock comprising first and second upper luminance blocks and first and second lower luminance blocks, each luminance block including a DC DCT coefficient and one AC DCT coefficient, the AC DCT coefficients of the first and second upper luminance blocks of the field picture macroblock being I and J, respectively and the DC DCT coefficients of the first and second lower luminance blocks of the field picture macroblock being K and L, respectively; and wherein the step of converting the frame picture into a first field picture includes the steps of:
subtracting the value C from A and multiplying the result by a constant X, where X is a positive number, to generate the value I;
subtracting the value D from B and multiplying the result by the constant X to generate the value J;
subtracting the value G from E and multiplying the result by the constant X to generate the value K;
subtracting the value H from G and multiplying the result by the constant X to generate the value L.

14. The method of claim 8, wherein the second field picture is a predictively coded field picture.

15. The method of claim 8, wherein the second field picture is a transparent field.

16. The method of claim 8, wherein the frame picture includes a pair of vertically adjacent macroblocks, each macroblock including DC DCT coefficients and AC DCT coefficients and wherein the step of converting the frame picture into a first field picture includes the steps of:
filtering each macroblock to remove the AC DCT coefficients; and
mapping the DC DCT coefficients of the pair of vertically adjacent macroblocks into a field picture macroblock.

17. The method of claim 8,
wherein the frame picture includes a pair of vertically adjacent macroblocks, the pair of vertically adjacent macroblocks including an upper macroblock and a lower macroblock, the upper and lower macroblocks each including a pair of upper and lower luminance blocks, each of the luminance blocks including a DC DCT coefficient and a plurality of AC DCT coefficients; and wherein the step of converting the frame picture into a first field picture includes the step of:
directly mapping the DC DCT coefficients and a single one of the AC DCT coefficients of half the luminance blocks of the pair of macroblocks into a field picture macroblock.

18. The method of claim 8,
wherein the frame picture includes a pair of vertically adjacent macroblocks, the pair of vertically adjacent macroblocks including an upper macroblock and a lower macroblock, the upper and lower macroblocks each including a pair of upper and lower luminance blocks; and wherein the step of converting the frame picture into a first field picture includes the step of:
combining the pair of upper luminance blocks of the upper macroblock and the upper luminance blocks of the lower macroblock together to form a luminance component of the field picture macroblock.

19. The method of claim 8,
wherein the frame picture includes a pair of vertically adjacent macroblocks, the pair of vertically adjacent macroblocks including an upper macroblock and a lower macroblock, the upper and lower macroblocks each including a pair of upper and lower luminance blocks; and wherein the step of converting the frame picture into a first field picture includes the step of:
combining the pair of lower luminance blocks of the upper macroblock and the lower luminance blocks of the lower macroblock together to form a luminance component of the field picture macroblock.

20. A data reduction device for reducing the amount of data required to represent a video image, comprising:
means for receiving digital video data including a pair of field pictures represented by digital data including encoded macroblocks;
means for processing a first one of the field pictures in the pair of field pictures to reduce the amount of digital data used to represent the first one of the field pictures;
means for replacing a second one of the field pictures, in the pair of field pictures, with a third field picture represented by less digital data then the field picture being replaced and for generating header information associated with the pair of field pictures, the header information including a control bit set to prevent a receiver from displaying the third field picture; and means for outputting received encoded macroblocks representing the first field picture, the third field picture and the header information.

21. A device for reducing the amount of data required to represent a video image, comprising:
  means for receiving a frame picture including encoded macroblocks representing the video image, the frame picture including DC DCT coefficients and AC DCT coefficients;
  means for filtering the frame picture to remove the AC DCT coefficients; and
  means for converting the frame picture into a first field picture including digital video data, for generating a second field picture, the second field picture including less digital video data than the first field picture, the first and second field pictures constituting a pair of field pictures and for generating header information associated with the pair of field pictures, the header information including a control bit set to prevent a receiver from displaying the second field of the field picture.

22. A method of reducing the amount of data required to represent a video image, comprising the steps of:
  receiving digital video data including a pair of interlaced video images, the pair of interlaced video images including a first and a second video image represented by digital data including encoded macroblocks;
  replacing one of the first and second video images, in the pair of interlaced video images, with a third video image represented by less digital data then the video image being replaced; and
  generating header information associated with the pair of interlaced video images, the header information instructing a receiver not to display the third video image in the pair of interlaced video images.

23. A method of reducing the amount of data required to represent a video image, comprising the steps of:
  receiving a non-interlaced video image including encoded macroblocks of video data representing the video image;
  converting the non-interlaced image into a first interlaced video image including digital video data;
  generating a second interlaced video image, the second interlaced video image including less digital video data than the first interlaced video image, the first and second interlaced video images constituting a pair of interlaced video images; and
  generating header information associated with the pair of interlaced video images, the header information instructing a receiver not to display the second video image in the pair of interlaced video images.

* * * * *